(12) United States Patent
Kuesel

(10) Patent No.: US 8,950,575 B2
(45) Date of Patent: Feb. 10, 2015

(54) CONVEYING ARRANGEMENT HAVING A DEVICE FOR GENERATING ELECTRIC CURRENT

(71) Applicant: Phoenix Conveyor Belt Systems GmbH, Bad Blankenburg (DE)

(72) Inventor: Bernd Kuesel, Hamburg (DE)

(73) Assignee: Phoenix Conveyor Belt Systems GmbH, Bad Blankenburg (DE)

( * ) Notice: Subject to any disclaimer, the term of this patent is extended or adjusted under 35 U.S.C. 154(b) by 0 days.

(21) Appl. No.: 14/133,091

(22) Filed: Dec. 18, 2013

(65) Prior Publication Data

US 2014/0103744 A1 Apr. 17, 2014

Related U.S. Application Data

(63) Continuation of application No. PCT/EP2012/060084, filed on May 30, 2012.

(30) Foreign Application Priority Data

Jun. 20, 2011 (DE) .......................... 10 2011 051 187

(51) Int. Cl.
*B65G 15/08* (2006.01)
*H02N 11/00* (2006.01)
(Continued)

(52) U.S. Cl.
CPC .............. *H02N 11/002* (2013.01); *B65G 15/60* (2013.01); *B65G 23/00* (2013.01); *B65G 2207/28* (2013.01)
USPC .......................................... 198/823; 198/841

(58) Field of Classification Search
CPC .... B65G 15/60; B65G 23/00; B65G 2207/28; H02N 11/002; H02N 11/056
USPC ............... 198/823, 841, 837, 846, 847, 550.2
See application file for complete search history.

(56) References Cited

U.S. PATENT DOCUMENTS 3,559,451 A * 2/1971 Hyer et al. ...................... 177/16
3,987,307 A 10/1976 Giconi
(Continued)

FOREIGN PATENT DOCUMENTS

DE 24 13 543 A1 10/1975
DE 32 19 170 A1 11/1983
(Continued)

OTHER PUBLICATIONS

International Search Report dated Aug. 21, 2012 of international application PCT/EP20121060084 on which this application is based.

*Primary Examiner* — James R Bidwell
(74) *Attorney, Agent, or Firm* — Walter Ottesen P.A.

(57) ABSTRACT

A conveying arrangement includes a conveyor belt having a carrying-side cover plate and a running-side cover plate. The conveying arrangement further includes a drive drum, a reversing drum, carrying rollers and a carrying structure. The conveying arrangement forms a material-conveying upper strand (A) with a charging location for the conveyed goods and a lower strand (B). A device for generating current is provided at the charging location for the conveyed goods underneath the conveyor belt of the upper strand (A). The device includes an impact bearing having sliding properties for the running-side cover plate of the conveyor belt of the upper strand (A). A generator is operatively connected to the impact bearing and a supporting device is provided for the generator. The generator converts at least part of the impact energy of the conveyed goods into electric current.

8 Claims, 1 Drawing Sheet

(51) Int. Cl.
  *B65G 15/60* (2006.01)
  *B65G 23/00* (2006.01)

(56) References Cited

U.S. PATENT DOCUMENTS

| | | | |
|---|---|---|---|
| 5,038,924 A * | 8/1991 | Stoll | 198/823 |
| 5,460,261 A | 10/1995 | Kusel et al. | |
| 5,660,283 A * | 8/1997 | Groh et al. | 198/720 |
| 5,686,653 A * | 11/1997 | Homer et al. | 177/50 |
| 5,970,712 A | 10/1999 | Stein | |
| 6,291,991 B1 | 9/2001 | Schnell | |
| 6,702,103 B1 | 3/2004 | Kuesel | |
| 6,781,515 B2 | 8/2004 | Kuzik et al. | |
| 6,831,566 B1 | 12/2004 | Kuesel | |
| 7,178,663 B2 | 2/2007 | Schnell | |
| 7,259,854 B2 | 8/2007 | Schnell | |
| 7,750,253 B2 | 7/2010 | Wineland | |
| 7,815,040 B2 * | 10/2010 | Kuiper et al. | 198/823 |
| 7,954,632 B2 | 6/2011 | Kropf-Eilers | |
| 8,149,989 B2 | 4/2012 | Schnell | |
| 8,531,049 B2 * | 9/2013 | Rosendall | 290/1 R |
| 8,770,391 B2 * | 7/2014 | Gibbs et al. | 198/823 |
| 2003/0000808 A1 | 1/2003 | Kusel | |
| 2009/0294257 A1 * | 12/2009 | Kuiper et al. | 198/823 |
| 2010/0230252 A1 * | 9/2010 | Felton | 198/841 |

FOREIGN PATENT DOCUMENTS

| | | |
|---|---|---|
| DE | 3414285 A1 | 10/1985 |
| DE | 35 17 314 A1 | 1/1986 |
| DE | 36 06 129 A1 | 8/1986 |
| DE | 36 12 765 A1 | 10/1987 |
| DE | 42 40 094 A1 | 6/1994 |
| DE | 44 44 264 C1 | 4/1996 |
| DE | 197 15 703 A1 | 10/1998 |
| DE | 101 29 091 A1 | 5/2002 |
| DE | 101 40 920 A1 | 5/2002 |
| DE | 10 2009 025 906 A1 | 12/2010 |
| DE | 10 2009 025 911 A1 | 12/2010 |
| DE | 10 2009 043 904 A1 | 3/2011 |
| EP | 0 336 385 A1 | 10/1989 |
| JP | 04-158208 A | 6/1992 |
| JP | 2000-292371 A | 10/2000 |
| WO | WO 01/00512 A1 | 1/2001 |
| WO | WO 2008/031648 A1 | 3/2008 |
| WO | WO 2008/034483 A1 | 3/2008 |

* cited by examiner

CONVEYING ARRANGEMENT HAVING A DEVICE FOR GENERATING ELECTRIC CURRENT

CROSS REFERENCE TO RELATED APPLICATIONS

This application is a continuation application of international patent application PCT/EP2012/060084, filed May 30, 2012, designating the United States and claiming priority from German application 10 2011 051 187.3, filed Jun. 20, 2011, and the entire content of both applications is incorporated herein by reference.

FIELD OF THE INVENTION

The invention relates to a conveying arrangement having a conveyor belt. The conveyor belt includes a carrying-side cover plate and a running-side cover plate, each made of a polymeric material with elastic properties. The conveying arrangement includes a drive drum, a reversing drum, carrying rollers and carrying structures. The conveying arrangement forms a material-conveying upper strand with a charging location for the conveyed material or goods and a lower strand usually free of conveyed material.

BACKGROUND OF THE INVENTION

A conveying arrangement of the above type is described in detail in the following:

| | |
|---|---|
| DE 36 06 129 A1 | EP 1 187 781 B1 |
| DE 36 12 765 A1 | U.S. Pat. No. 6,831,566 |
| U.S. Pat. No. 5,460,261 | U.S. Pat. No. 7,259,854 |
| EP 0 336 385 B1 | WO 2008/034483 A1 |
| U.S. Pat. No. 6,291,991 | U.S. Pat. No. 7,178,663 B2 |

The carrying-side and running-side cover plates of a conveyor belt as a main component of a conveying arrangement usually include a rubber mixture, containing a rubber component or a rubber component blend, a crosslinking agent or a crosslinking system, comprising a crosslinking agent and an accelerator, and usually further mixing ingredients, in particular a filler and/or a processing aid and/or an antioxidant and/or a plasticizer and/or other additives (for example fibers, color pigments).

The relevant basis for the rubber is in particular:
natural rubber (NR)
butadiene rubber (BR)
chloroprene rubber (CR)
styrene-butadiene rubber (SBR)
nitrile rubber (NBR)
butyl rubber (IIR)
ethylene-propylene rubber (EPM)
ethylene-propylene-diene rubber (EPDM)
SBR/NR blend
SBR/BR blend
NR/BR blend Particularly important so far has been CR, which is distinguished by a high flame, weathering and aging resistance, in particular for conveyor belts that are used in underground mining. In surface mining, NR and the aforementioned blends (DE 10 2009 043 904 A1) have also gained greater importance.

The required elastic properties are imparted to the conveyor belt as a result of the vulcanization of a rubber mixture of the aforementioned type.

The conveyor belt is usually also provided with an embedded reinforcement. Cables of steel or aramid running parallel in the longitudinal direction of the conveyor belt are used as reinforcement, cables of steel being of particular importance. The reinforcement may, however, also be a single- or multiply textile formation, in particular in the form of a woven fabric. Of particular importance here is a polyamide-polyester fabric. In particular in connection with steel cable conveyor belts, a transverse reinforcement of synthetic cords, for example of polyamide, that are embedded in the carrying-side and/or running-side cover plate is additionally used for the purpose of preventing splitting (WO 2008/034483 A1).

The following components may also be embedded in the carrying-side and/or running-side cover plate: conductor loops, transponders, barcodes, a polymer matrix with mixed-in detectable particles or other detectable elements. In this respect, reference is made to the following patent literature in particular:

| |
|---|
| DE 44 44 264 C1 |
| DE 197 15 703 A1 |
| U.S. Pat. No. 7,954,632 |
| U.S. Pat. No. 6,781,515 |

The conveyor belt may also be provided with a built-on part, for example with a driver part, guiding part and with edge and side-wall profiles. Such built-on parts consist of a polymeric material (elastomer, thermoplastic elastomer, thermoplastic) and are adhesively bonded at the foot to the carrying-side surface of the elastic conveyor belt. Such built-on parts are described in particular in the following patent literature:

| |
|---|
| DE 32 19 170 A1 |
| DE 34 14 285 A1 |
| DE 10 2009 025 906 A1 |
| DE 10 2009 025 911 A1 |

Further components of a conveying arrangement may be: deflection rollers or deflection drums; hold-down rollers in the case of pipe conveyor belt installations; correction rollers, in particular in the case of pipe conveyor belt installations; chutes at the charging location for the conveyed material; and, monitoring devices.

With respect to the monitoring devices, the following possibilities with extensive development activities may be mentioned in particular:

Optoelectronic systems, in particular in the form of a line scan camera or an area scan camera, are used for monitoring damage to the carrying-side and/or running-side cover plate, reference being made in this respect to the following patent literature in particular:

| | |
|---|---|
| DE 24 13 543 A1 | DE 101 29 091 A1 |
| DE 42 40 094 A1 | DE 101 40 920 A1 |
| U.S. Pat. No. 6,702,103 | EP 1 187 781 B1 |
| U.S. Pat. No. 6,831,566 | U.S. Pat. No. 7,259,854 |
| US 2003/0000808 | WO 2008/031648 A1 |

Of increasing importance is the inspection of a conveyor belt by means of high-energy beams, in particular x-ray beams. Such a device is described in particular in the following patent literature:

DE 35 17 314 A1
U.S. Pat. No. 8,149,989
JP 04158208 A (Patent Abstracts of Japan)
JP 2000292371 A (Patent Abstracts of Japan)

In spite of extensive development work in the area of conveying arrangements, there has so far been an as yet unresolved problem, which is described more specifically below.

When conveying material by conveyor belts, the conveyed material, for example coal, ores or minerals, is charged onto the running conveyor belt at a charging location of the conveying arrangement. In an extreme case, this comprises 40000 tonnes per hour, and with a drop height of up to 18 meters. To minimize the high degree of loading to which the conveyor belt is subjected by the impact of the conveyed material, the running-side cover plate of the conveyor belt is supported by an impact device, which for example includes the supporting rollers. This impact device partially absorbs the kinetic energy.

SUMMARY OF THE INVENTION

The object of the invention is to provide a conveying arrangement that converts the non-absorbed kinetic impact energy or the non-absorbed impact pressure of the conveyed material at the charging location into electric current.

This object is achieved by the conveying arrangement being provided at the charging location for the conveyed material, underneath the conveyor belt of the upper strand, with a device for generating electric current. This device includes an impact bearing with sliding properties for the running-side cover plate of the conveyor belt of the upper strand, at least one generator, which is in connection with the impact bearing, and a supporting device for the generator, wherein the generator converts at least part of the impact energy of the conveyed material into electric current.

With regard to the impact bearing, which must also have sliding properties and consequently serves additionally as a sliding bearing, the following variants are used in particular:

Since the conveying arrangement is equipped with a multiplicity of carrying rollers (carrying roller system), at least one carrying roller serves as an impact bearing, wherein the carrying roller spindle is operatively connected to the generator. The impact bearing preferably consists of two or more carrying rollers, wherein each carrying roller spindle has contact with a generator.

The impact bearing consists of at least one impact damper, which is in connection with the generator. Here, too, the impact bearing preferably consists of two or more impact dampers, wherein each impact damper has contact with a generator. If appropriate, the contact surface of the impact bearing with respect to the running-side cover plate of the conveyor belt of the upper strand is equipped with a layer with good sliding properties, for example of a fluoropolymer, in particular of polytetrafluoroethylene.

With regard to the generator, which may also be referred to here as a pressure-current converter, the following variants are in turn used:

The generator consists of a piezoelectric material, such as in particular a lead-titanate, lead-zirconate or lead-titanate-zirconate.

Piezoelectric energy generators that convert vibrations into electrical energy have already been developed in this connection. This energy is supplied to a sensor with a radio interface, so that a batteryless and wireless sensor system is realized. As an example, mention may be made here of the HSG-IMIT, developed by the Institute for Microsystem Technology of the Albert-Ludwig University of Freiburg.

A generator on an electrostrictive, magnetostrictive or electrostatic basis is used.

Electrostrictive microactuators resemble piezoelectric actuators in their operating mode. They likewise have fast response times and a small displacement with great forces. Electrostrictive plastics, for example polyacrylates, are used in particular.

Magnetostriction is the deformation of ferromagnetic materials as a result of an applied magnetic field.

Electrostatics comprises a branch of physics that is concerned with stationary electric charges, charge distributions and the electrical fields of charged bodies.

The current generated in this way is conducted away and used, for example for the conveyor belt drive and/or a monitoring device.

There are also conveying arrangements that are additionally loaded in the lower strand. From this aspect, according to the teaching of this invention, the generation of the electric current could take place on the upper strand and on the lower strand.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
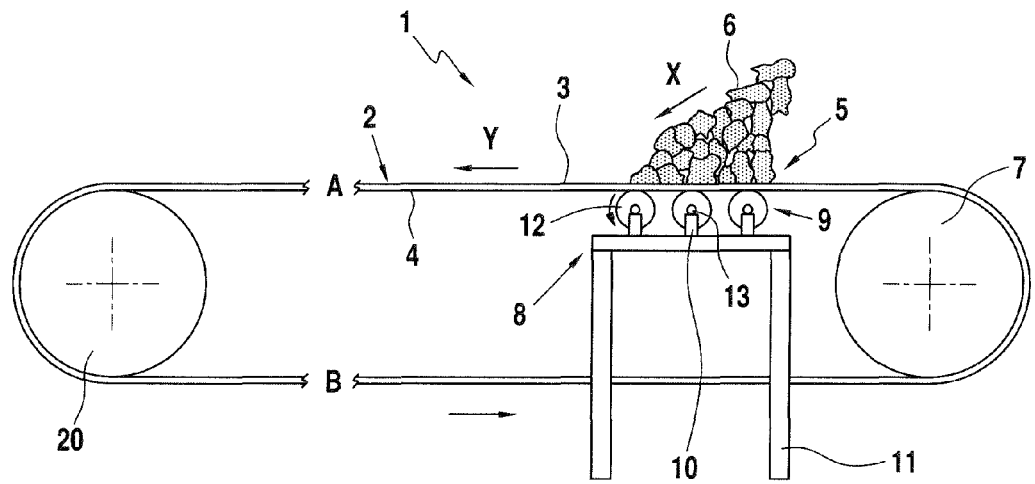
FIG. 1 is a schematic of a conveying arrangement with a device for generating electric current, comprising an impact bearing in the form of carrying rollers, generators and a supporting device; and, FIG. 2 is a schematic of a conveying arrangement with a device for generating electric current, comprising an impact bearing in the form of impact dampers, generators and a supporting device.

FIG. 1 shows a conveying arrangement 1 with a conveyor belt 2 having a carrying-side cover plate 3 for the conveyed material or goods and a running-side cover plate 4. Each cover plate is made of a polymeric material with elastic properties, for example of a vulcanized rubber mixture on the basis of CR, and also with an embedded reinforcement, for example in the form of steel ropes. The running-side cover plate 4 is supported within the upper strand A and lower strand B on carrying rollers in the form of a carrying roller system.

At the charging location 5 of the conveying arrangement 1, the conveyed material 6, for example an ore, is charged onto the carrying-side cover plate 3 of the conveyor belt 2. This charging location is usually located in the vicinity of the drive drum 7, which moves the conveyed material in the conveyed material direction X and in the running direction Y of the conveyor belt to the target location, which is the reversing drum 20 as a discharge drum.

At the charging location 5 for the conveyed material 6, underneath the conveyor belt 2 of the upper strand A, the conveying arrangement 1 is provided with a device 8 for generating electric current. This device includes an impact bearing 9 in contact with the running-side cover plate 4 of the conveyor belt within the upper strand A. The impact bearing includes here three carrying rollers 12 as part of the carrying roller system of the conveying arrangement. Each carrying roller spindle 13 is connected to a generator 10 so that three generators are present here and lie on a supporting device 11.

The generator or the generator system converts at least part of the impact energy into current, which is conducted away and used in particular for the operation of the arrangement.

Figure 2:
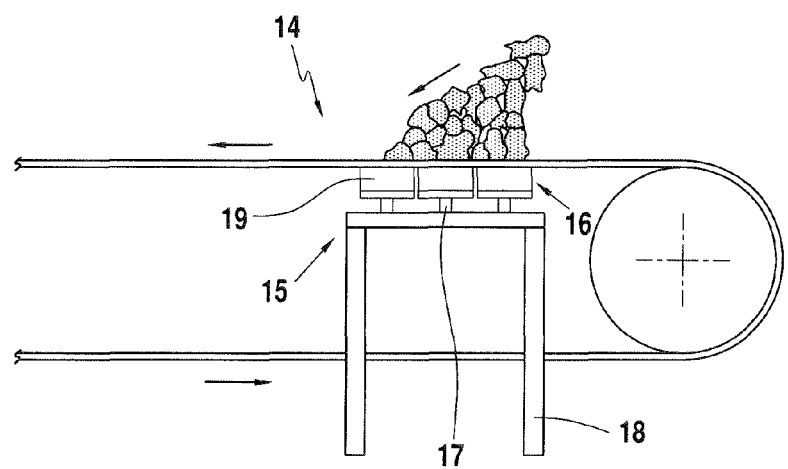

FIG. 2 then shows a conveying arrangement 14 with the same basic arrangement concept as in the case of the conveying arrangement 1 that is shown in FIG. 2. However, the device 15 for generating electric current here includes, as an impact bearing 16, three impact dampers 19 instead of carrying rollers. Each impact damper is provided with a generator 17. The generators, of which there are likewise three here, lie on a supporting device 18. The generation of the electric current takes place on the basis of the same principle as in the case of the device 8 according to the conveying arrangement 1 that is shown in FIG. 1.

It is understood that the foregoing description is that of the preferred embodiments of the invention and that various changes and modifications may be made thereto without departing from the spirit and scope of the invention as defined in the appended claims.

LIST OF REFERENCE CHARACTERS (Part of the Description)
1 conveying arrangement
2 conveyor belt
3 carrying-side cover plate
4 running-side cover plate
5 charging location for the conveyed material
6 conveyed material
7 drive drum
8 device for generating electric current
9 impact bearing
10 generator
11 supporting device
12 carrying roller
13 carrying roller spindle
14 conveying arrangement
15 device for generating electric current
16 impact bearing
17 generator
18 supporting device
19 impact damper
20 reversing drum
A upper strand
B lower strand
X conveyed material direction at the charging location
Y running direction of the conveyor belt

What is claimed is:

1. A conveyor arrangement comprising:
a conveyor belt having a carrying-side cover plate for receiving goods to be conveyed thereon and a running-side cover plate;
each of said cover plates being made of a polymer material having elastomeric characteristics;
a drive drum for imparting movement to said conveyor belt;
a reversing drum for directing said conveyor belt back to said drive drum;
said conveyor belt having a goods carrying upper strand (A) leaving said drive drum and a mostly goods free lower strand (B) moving onto said drive drum as said conveyor belt moves over said drive drum and said reversing drum;
a discharge location above said upper strand (A) whereat said goods are charged onto said upper strand (A);
a device for generating current provided at said discharge location below said upper strand (A);
said device including an impact bearing which generates impact energy in response to the impact of said goods charged onto said upper strand (A);
said impact bearing and said running-side cover plate conjointly defining a contact interface whereat said impact bearing has sliding characteristics;
said device further including at least one generator operatively connected to said impact bearing causing said generator to convert at least a portion of said impact energy into a current; and,
a support structure for supporting said generator.

2. The conveyor arrangement of claim 1, wherein said impact bearing includes at least one support roller defining a support roller spindle; and, said generator is operatively connected to said spindle.

3. The conveyor arrangement of claim 2, wherein said impact bearing includes a plurality of said support rollers defining respective support roller spindles operatively connected to said generator.

4. The conveyor arrangement of claim 1, wherein said impact bearing includes at least one impact damper operatively connected to said generator.

5. The conveyor arrangement of claim 4, wherein said impact bearing includes a plurality of impact dampers and a plurality of said generators operatively connected to corresponding ones of said impact dampers.

6. The conveyor arrangement of claim 1, wherein said generator comprises a piezoelectric material.

7. The conveyor arrangement of claim 6, wherein said piezoelectric material is a lead-titanate, lead-zirconate or lead-titanate-zirconate.

8. The conveyor arrangement of claim 1, wherein said generator is configured on an electrostrictive, magnetostrictive or electrostatic basis.

* * * * *